United States Patent Office 3,240,563
Patented Mar. 15, 1966

3,240,563
PURIFICATION OF REFRACTORY MATERIALS
Robert A. Mercuri, Brook Park, and Lawrence M. Litz, Lakewood, Ohio, assignors to Union Carbide Corporation, a corporation of New York
No Drawing. Filed Aug. 21, 1963, Ser. No. 303,662
14 Claims. (Cl. 23—191)

The present invention relates to a process for removing impurities from refractory materials. More particularly, the present invention is directed to the removal of oxygen impurities from refractory materials such as boron nitride.

Boron nitride material is widely employed in the manufacture of articles for use at high temperatures such as crucibles, aluminum vaporization boats, and the like. However, commercially available boron nitride material powders invariably contain relatively high proportions of oxygen as an impurity, e.g., as much as 15 percent by weight, in the form of boron oxide or hydrate thereof.

The presence of this oxygen impurity in the boron nitride material in large amounts is highly undesirable since it has a deleterious effect on the high temperature properties of articles which are subsequently manufactured therefrom. For example, articles fabricated by hot pressing or sintering from boron nitride material which contains excess oxygen impurities exhibit severe surface cracking and oxide exudation in high temperature service.

It is therefore an object of the present invention to provide a process for removing undesirable oxygen impurities from boron nitride and other refractory materials.

Other objects will be apparent from the following description and claims.

A process in accordance with the present invention for removing oxygen impurities from refractory material, e.g. boron nitride, comprises contacting the material to be purified with a water vapor laden gas, or steam, at a temperature above about 120° C.

In the practice of a particular embodiment of the present invention, oxygen impurity-containing boron nitride powder is placed in a suitable vessel, for example a quartz glass tube, and the boron nitride material is then heated to the process operating temperature. A water vapor laden stream of gas, or steam, is then continuously passed through the vessel in contact with the boron nitride until the desired amount of oxygen impurity is removed. The temperature of the water vapor is at least 120° C. and preferably about 300° C.

As a result of the contact of the stream of water vapor with the boron nitride material, oxygen impurities are vaporized out of the boron nitride material and removed with the exiting gases.

After the aforedescribed treatment the boron nitride powder is cooled to room temperature and removed from the vessel. The powder thus treated is suitable for fabrication into crucibles and like articles by conventional sintering and hot pressing techniques.

In the present invention, any commercial boron nitride material powder can be purified of oxygen impurities. ordinarily, commercially available boron nitride powders contain from about 2.5 to 15 percent oxygen as impurities and are composed of particles sized through 10 mesh. Such materials can be treated by the process of the present invention to provide a product containing substantially less than about ⅓ the initial oxygen content.

As regards the water vapor treatment itself, it has been found that the temperature of the water vapor should be 120° C. or higher to provide effective oxygen removal. Temperatures as high as 450° C. can be used when treating powders, however higher temperatures should be avoided on account of adverse effects upon the material being treated, including possible reoxidation. As previously mentioned 300° C. is the preferred operating temperature.

As indicated, the water vapor as used in the present invention can be steam, i.e. 100% water vapor or a mixture of water vapor and non-reactive carrier gas such as argon. When water-vapor gas mixtures are used, the water vapor should constitute at least 1.5 percent by volume of the mixture.

Air can be uesd as the carrier gas, however, at high operating temperatures in the vicinity of 450° C., an oxygen-free carrier gas is advisable to avoid the possibility of reoxidation of the boron nitride powder.

In a preferred embodiment of the present invention, the water vapor in the mixture is in an amount at least that which is present in an argon-H$_2$O mixture having a dew point of 90° C. or higher. When using this preferred water vapor mixture, the preferred operating temperature range is 200° C. to 400° C. Under these particular operating conditions, the rate of oxygen impurity removal is very rapid and a much larger overall amount of oxygen impurity can be removed.

In a further embodiment of the present invention, fabricated articles which are formed in whole or in part from boron nitride material, can be effectively treated in essentially the same manner as boron nitride powder to remove oxygen impurities. Such articles include hot pressed and sintered materials which have been sintered or hot pressed under conditions of 500 to 2000 p.s.i. and 1700 to 2200° C. Hot pressed boron nitride articles (molded at 1000 p.s.i. and 1800° C.) in sixes 1 cm. x 0.5 cm. x 4 cm. have been treated by the present invention with a 70 fold reduction of oxygen content, e.g. from 2.8 percent to 0.04 percent.

When treating fabricated articles of the type mentioned, higher processing temperatures up to 850° C. can be used. Also, air can be used as carrier gas for the water vapor at temperatures higher than 450° C. However at operating temperatures in the vicinity of 850° C., it is advisable to use oxygen-free carrier gases. As in the treatment of boron nitride powders, the preferred process operating temperature is 300° C.

Although the foregoing description has dealt specifically with the treatment of boron nitride material, other materials such as boron, boron carbide and titanium borides can be purified of oxygen impurities in the same manner.

The following examples are provided to further illustrate the present invention.

EXAMPLE I

Commercial boron nitride powder (average particle size 150 microns) in the amount of about 1.5 grams and having an oxygen content of 10.1 percent was placed on a platinum tray which was centrally located in a horizontally disposed quartz glass tube 12 inches long having a 2½ inch inner diameter. The quartz tube was sealed except for an inlet at one end for the introduction of a water vapor-gas mixture and an outlet at the other end for exit of water vapor and gases. The quartz tube was externally heated to 400° C. and a mixture of argon and water vapor was passed through the tube at this temperature at a rate of 2 cubic feet per hour for about one hour. The ratio by volume of water vapor to argon in the mixture was 1:2.

The flow of water vapor continuously contacted the boron nitride material and removed oxygen impurities therefrom which were transported out of the quartz tube by the argon-water vapor mixture.

The final oxygen content of the treated material was 2.8 percent.

EXAMPLE II

A fabricated boron nitride sample 1 cm. x .5 cm. x 4 cm. formed by hot pressing (1000 p.s.i. and 1800° C.)

a powder milled through 10 mesh was placed on a fritted quartz disk located in the lower portion of a vertically positioned quartz glass tube 12 inches long having a 2½ inch inner diameter. The oxygen content of the hot pressed sample was 2.8 weight percent. The quartz tube was sealed except for an inlet at its lower end for the introduction of a water vapor-gas mixture and an outlet at its upper end for exit of water vapor and gases. The quartz tube was externally heated to 300° C. and a mixture of argon and water vapor was passed through the tube at this temperature at a rate of 5 cubic feet per hour for 10 hours. (The argon was saturated with water vapor at a dew point of 90° C.)

The flow of water vapor continuously contacted the boron nitride sample and removed oxygen impurities therefrom which were transported out of the quartz tube by the argon-water vapor mixture.

The final oxygen content of the treated material was 0.04 percent.

EXAMPLE III

Boron carbide powder (average particle size 150 microns) in the amount of 84 grams and having an oxygen content of 4.0 weight percent was placed on a fritted quartz disk located at the lower portion of a vertically positioned quartz glass tube 12 inches long having a 2½ inch inner diameter. The quartz tube was sealed except for an inlet at one end for the introduction of a water-vapor-gas mixture and an outlet at the other end for exit of water vapor and gases. The quartz tube was externally heated to 500° C. and a stream of steam was passed through the vessel at this temperature at a rate of 3.4 cubic feet per hour for 3 hours. The flow of steam continuously contacted the boron carbide material and removed oxygen impurities therefrom which were transported out of the quartz tube by the stream of water vapor.

The final oxygen content of the treated material was 0.5 weight percent.

Further, by way of example, and to indicate the advantages of a preferred embodiment of the present invention, Table I is provided which shows the effect of temperature and water vapor content on the process of the present invention.

The data in Table I was obtained by treating different fabricated samples of boron nitride. These samples were 1 cm. x 0.5 cm. x 4 cm. in size and were hot pressed (1000 p.s.i. and 1800° C.) from the same lot of commercial boron nitride powder which was milled through 100 mesh. The initial oxygen content of each of the hot pressed samples was about 2.8 percent.

The treatment of the samples was accomplished in the apparatus described in Example II and the rate of flow of the water vapor-argon mixture was 3 cubic feet per hour for all sample treatments. The water vapor content and temperature were varied for the treatment of the different samples as indicated in the table.

Table I

| Sample | Process Operating Temperature, ° C. | Dew Point of H₂O in Gas Mixture, ° C. | Relative Amount of Oxygen Removal from Sample after 5 hours, parts (wght.) |
|---|---|---|---|
| I | 210 | 70 | 110 |
| II | 200 | 90 | 225 |
| III | 300 | 70 | 170 |
| IV | 300 | 90 | 275 |
| V | 400 | 70 | 170 |
| VI | 400 | 90 | 260 |

As indicated in Table I, oxygen impurities are most rapidly removed at an operating temperature of about 300° C. when the dew point of $H_2O$ in the argon-$H_2O$ mixture is 90° C.

Also, after about 10 hours of treatment, oxygen removal from samples II, IV and VI (90° C. dew point) was substantially complete (i.e. oxygen content was less than 0.1 percent) whereas after the same period of time samples I, III and V still contained at least 20 percent of their original oxygen content.

In a further example two different crucibles were made by hot pressing (1800° C. and 1000 p.s.i.) commercial boron nitride powder which had been milled through 100 mesh. The initial oxygen content of the boron nitride powder was about 10 weight percent.

One of the crucibles was treated in the manner of Example II for 16 hours using the same argon-water vapor mixture at a rate of 3 cubic feet per hour. The other crucible was not further treated after fabrication.

Both crucibles were then rapidly treated to about 1800° C. under vacuum conditions. The untreated crucible cracked severely during heating whereas the crucible treated in accordance with the present invention did not crack. The dimensions of both crucibles, which were in the form of cylindrical cups were 1 inch outer diameter, ¾ inch inner diameter, and 1 inch high with a cavity ¾ inch deep.

The mesh sizes referred to herein are Tyler Series.

What is claimed is:

1. A process for removing oxygen impurities from an oxygen-contaminated material selected from the group consisting of boron nitride, boron carbide and titanium borides which comprises contacting the material to be purified with a water vapor laden non-reactive gas at a temperature from above about 120° C. up to about 850° C. for a time sufficient to provide the desired removal of oxygen impurities from said selected material, temperatures up to about 450° C. being employed when the material being treated is sized finer than 10 mesh.

2. A process for removing oxygen impurities from an oxygen-contaminated hot pressed material selected from the group consisting of boron nitride, boron carbide and titanium borides which comprises contacting the material to be purified with a water vapor laden non-reactive gas at a temperature between about 120° C. and 850° C. for a time sufficient to provide the desired removal of oxygen from said selected material.

3. A process for removing oxygen impurities from an oxygen contaminated material selected from the group consisting of boron nitride, boron carbide and titanium borides which comprises contacting the material to be purified with a water vapor-argon gas mixture at a temperature of about 300° C. for a time sufficient to provide the desired removal of oxygen from said material, the dew point of $H_2O$ in said argon-water vapor mixture being about 90° C.

4. A process for removing oxygen impurities from oxygen-contaminated boron nitride material which comprises contacting the material to be purified with a water vapor-argon gas mixture at a temperature from above about 120° C. to about 850° C. for a time sufficient to provide the desired removal of oxygen impurities therefrom, temperatures up to about 450° C. being employed when the material being treated is sized finer than 10 mesh.

5. A process for removing oxygen impurities from an oxygen-contaminated boron nitride material which comprises contacting the material to be purified with a water vapor-air mixture at a temperature from above about 120° C. to about 850° C. for a time sufficient to provide the desired removal of oxygen impurities therefrom, temperatures up to about 450° C. being employed when the material being treated is sized finer than 10 mesh.

6. A process for removing oxygen impurities from an oxygen-contaminated boron nitride material which comprises contacting the material to be purified with a water vapor-argon gas-mixture at a temperature from above about 120° C. to about 850° C. for a time sufficient to provide the desired removal of oxygen therefrom, said water vapor-argon gas mixture being at least 1.5 percent by volume water vapor and temperatures up to about 450° C. being employed when the material being treated is sized finer than 10 mesh.

7. A process for removing oxygen impurities from an oxygen-contaminated boron nitride material which comprises contacting the material to be purified with a water vapor-air mixture at a temperature from above about 120° C. to about 850° C. for a time sufficient to provide the desired removal of oxygen therefrom, said water vapor-air mixture being at least 1.5 percent by volume water vapor and temperatures up to about 450° C. being employed when the material being treated is sized finer than 10 mesh.

8. A process for removing oxygen impurities from oxygen-contaminated powdered boron nitride material which comprises contacting the material to be purified with a water vapor-argon gas mixture at a temperature between about 120° C. and 450° C. for a time sufficient to provide the desired removal of oxygen therefrom.

9. A process in accordance with claim 8 wherein water vapor is at least 1.5 percent by volume of the water vapor-argon gas mixture.

10. A process for removing oxygen impurities from oxygen-contaminated hot pressed boron nitride material which comprises contacting the material to be purified with a water vapor-argon gas mixture at a temperature between about 120° C. and 850° C. for a time sufficient to provide the desired removal of oxygen therefrom.

11. A process in accordance with claim 10 wherein water vapor is at least 1.5 percent by volume of the water vapor-argon gas mixture.

12. A process for removing oxygen impurities from oxygen-contaminated hot pressed boron nitride material which comprises contacting the material to be purified with a water vapor-air mixture at a temperature between about 120° C. and 850° C. for a time sufficient to provide the desired removal of oxygen therefrom.

13. A process in accordance with claim 12 wherein water vapor is at least 1.5 percent by volume of the water vapor-air mixture.

14. A process for removing oxygen impurities from oxygen-contaminated hot pressed boron nitride material which comprises contacting the material to be purified with steam at a temperature between about 120° C. and 850° C. for a time sufficient to provide the desired removal of oxygen therefrom.

References Cited by the Examiner

UNITED STATES PATENTS 2,794,708  6/1957  Haag _____ 23—209

FOREIGN PATENTS 397,463  11/1931  Great Britain.

MAURICE A. BRINDISI, *Primary Examiner.*